United States Patent Office 3,796,732
Patented Mar. 12, 1974

3,796,732
PROCESS FOR OXIDIZING PHENOLS
TO QUINONES
Wolf Brenner, Oberwil, Switzerland, assignor to
Hoffmann-La Roche Inc., Nutley, N.J.
No Drawing. Filed May 8, 1972, Ser. No. 250,886
Claims priority, application Switzerland, May 17, 1971,
7,228/71; Dec. 17, 1971, 18,434/71
Int. Cl. C07c 49/64
U.S. Cl. 260—396 R                                13 Claims

ABSTRACT OF THE DISCLOSURE

Process for oxidizing a methyl substituted phenol to a methyl substituted quinone by contacting the phenol, in a solution containing copper and halogen ions, with oxygen.

BACKGROUND OF THE INVENTION

Quinones, such as trimethylquinones, are important starting materials for the manufacture of tocopherols. Quinones have heretofore been obtained, inter alia, from the corresponding phenols by treatment with an oxidizing agent such as potassium permanganate or lead oxide. A problem has been encountered, however, in the use of such oxidizing agents in that solid metal oxides, such as manganese and lead oxides, are formed and precipitated together with the quinones as they are formed. The solid metal oxides have contaminated the quinone product and thereby have presented a substantial roadblock to the production of pure quinones by oxidation methods.

In the manufacture of tocopherols, such contamination by metal oxides has been particularly serious because a high degree of purity is required in the quinone starting material. There has been a need therefore for an oxidation process for obtaining quinones from phenols in large yields and with a high degree of purity.

In order to find replacements for metal containing oxidizing agents, oxidation experiments have been carried out using, instead of metal containing oxidizing agents, copper salts which remain in solution during the whole course of an oxidation as oxygen carriers. From such experiments, it has been reported that under the conditions heretofore employed, using a primarily or intermediately formed complex of a copper compound as the catalyst, the oxidation of phenols invariably produces as by-products polymeric ethers and dimeric quinones. For example, the literature reports that the action of oxygen upon an alkylated phenol having a free para-position, in the presence of a copper catalyst and a nitrogen-containing base, produces as by-products polyphenyl ethers and, possibly, under certain conditions a dimeric quinone.

SUMMARY OF THE INVENTION

In accordance with this invention, a process is provided for obtaining a quinone of the formula:

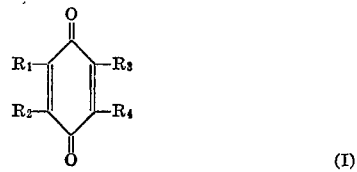

(I)

wherein $R_1$, $R_2$, $R_3$ and $R_4$ are hydrogen or methyl; with the proviso that at least one of $R_1$, $R_2$, $R_3$ and $R_4$ is methyl;

comprising treating a solution containing a phenol of the formula:

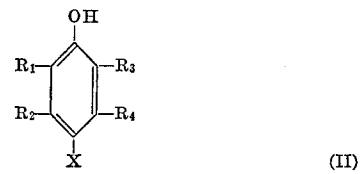

(II)

wherein $R_1$, $R_2$, $R_3$ and $R_4$ are as above; and earlier X is hydrogen, chlorine bromine or iodine;

and copper ions and halogen ions with oxygen or an oxygen containing gas, said solution containing a complexing agent in an amount such that the molar ratio of the complexing agent to copper is from 0 to 2.

By this process, high yields of monomeric quinones can be expeditiously obtained, without the production of appreciable amounts of polyphenyl ethers and/or dimeric quinones as by-products.

DETAILED DESCRIPTION OF THE INVENTION

As used throughout this application, the term "halogen ion," unless otherwise stated, includes ions of chlorine bromine, and/or iodine. The preferred halogen ions are the bromine and chlorine ions, particularly the chlorine ions. Also herein, the term "copper ions" comprehends cuprous or copper (I) ions or cupric or copper (II) ions or a combination of copper (I) and copper (II) ions. The preferred copper ions are the copper (II) ions.

By the process of this invention, a phenol of Formula II can be oxidized to a quinone of Formula I by treating a solution containing copper ions and halogen ions with oxygen ($O_2$) or an oxygen containing gas, preferably pure oxygen. In carrying out this reaction, the solution containing the phenol of Formula II and the copper and halogen ions, can contain a complexing agent. Preferably, the reaction is carried out without the use of any complexing agent in the reaction medium. However, the reaction can also be suitably carried out in accordance with this invention with the reaction medium containing a complexing agent in an amount up to a molar ratio of complexing agent to copper of about 2. Thus, in the process of this invention, oxidation of the phenol of Formula II is carried out with oxygen or an oxygen-containing gas in a solution containing the copper and halogen ions and the complexing agent in an amount such that the molar ratio of complexing agent to copper is from 0 to about 2, i.e., the ratio is at most about 2.

In carrying out this process, any conventional inert organic solvent can be utilized to provide a solution containing the phenol and the copper and halogen ions. In this process, polar solvents which are soluble in water or unlimitedly miscible with water are preferred, especially those solvents in which the reactants, the reaction products and the catalyst remain in solution from the beginning to the end of the oxidation. Among the especially preferred solvents are: alkanols, particularly lower alkanols such as methyl alcohol, ethyl alcohol and isopropyl alcohol; glycols, particularly, ethylene glycol propylene glycol; ethers, particularly ethylene glycol monomethyl ether; ketones, particularly acetone; esters particularly ethyl acetate; amides, particularly dimethylformamide and dimethyl acetamide; and sulphoxides, particularly dimethyl sulphoxide. Of these solvents, the ethers, ketones and amides are quite particularly preferred. In this process, the preferred solvents can be used alone or in combination with water.

The copper and halogen ions utilized in the oxidation of this invention are conveniently provided in the form of the corresponding salts which may be present as hydrates, i.e., as copper (I) chloride or copper (II), copper (I) bromide or copper (II) bromide or copper (I) iodide. Alternatively, the copper and halogen ions can be provided by a copper salt of a mineral acid or organic acid, which possesses the requisite solubility properties, in combination with a suitable hydrohalic acid or a salt of such an acid. Among the preferred copper salts are copper sulphate, copper nitrate and copper acetate. Among the preferred salts of the hydrohalic acids are the alkali metal and alkaline earth metal salts, particularly sodium chloride, sodium bromide, potssium iodide and magnesium chloride.

As indicated above, the oxidation of this invention is preferably carried out in the absence of a complexing agent in the reaction medium. It has been found that the yield of monomeric quinones in this process decreases to about the same extent as the amount of complexing agent present in the oxidation medium increases. This is especially true in the oxidation of phenols which are substituted by only one or two methyl groups. However, small amounts of a complexing agent can be tolerated, the upper limit being a molar ratio of complexing agent: copper=about 2:1. It has been found that when trimethyl- or tetramethyl-substituted phenols of Formula II are utilized as the starting materials, only up to about 45% yields of monomeric quinone can be obtained with the molar proportion of complexing agent being at its upper limit (i.e. complexing agent:copper=2:1) whereas with the preferred, complete absence of a complexing agent (i.e. complexing agent:copper=0), the yield of monomeric quinones can be up to 99%.

In carrying out this process, pure oxygen as well as any oxygen-containing gas, such as air, can be utilized as the oxidizing agent. In this process, when air is utilized, there must always be present during the whole course of the oxidation, at least the stoichiometric amount of oxygen necessary for the oxidation. The oxygen concentration in this process is directly related to the speed of the oxidation and to the yield of the oxidation product.

The phenol starting materials of Formula II and the quinone products of Formula I are known. In accordance with the present invention, 2-methyl-quinone can be obtained from o- or m-cresol; 2,6-dimethylquinone can be obtained from 2,6- or 3,5-xylenol; 2,5-dimethylquinone can be obtained from 2,5-xylenol; 2,3-dimethylquinone can be obtained from 2,3-xylenol; trimethylquinone can be obtained from 2,3,5- or 2,3,6-trimethylphenol; and 2,3,5,6-tetramethylquinone can be obtained from 2,3,5,6-tetramethylphenol. In this process, it is preferred that $R_1$ and $R_2$ be methyl and only one of $R_3$ and $R_4$ be methyl.

The process of this invention is preferably carried out by first dissolving the phenol of Formula II in one of the preferred polar solvents, mentioned above, particularly aqueous acetone, dimethylformamide or ethylene glycol monomethyl ether. Thereafter, the resulting phenolic solution is preferably added dropwise into a solution of the catalyst, which is being vigorously gassed with oxygen. Preferably, the catalyst-containing solution is a solution of copper (II) chloride dissolved in the same solvent in which the phenol is dissolved. Then, the resulting quinone is preferably extracted with a water-immiscible solvent, isolated and purified by rectification.

In carrying out the process of this invention, temperature and pressure are not critical, and the reaction can be carried out at room temperature (22° C.) and atmospheric pressure. In general, it is preferred to carry out the oxidation in a closed system under an oxygen pressure of about 1–100 atmospheres. preferably 1 to 50 atmospheres absolute. Generally, it is also preferred to carry out the oxidation at a temperature between room temperature and, especially when air is used as the oxidizing agent, the boiling point of the solution containing the phenol and copper and halogen ions, with a temperature between about 50° C. and 70° C. being particularly preferred.

Particularly good results with regard to yield and selectively are obtained in this process when the oxidation is controlled in such a way that, as the reaction proceeds, only as much phenol as can be oxidatively converted comes into contact with the catalyst. This can be achieved by employing a relatively large amount of catalyst and by dropping the phenol into the oxidation medium over a long period of time. Providing a ratio of gram atom of copper to mol of phenol in the oxidation medium of about 0.5:1 to 2:1 has been found to be a particularly preferred process expedient for providing good yields and selectivity of this oxidation.

In this process, the duration of the oxidation depends on various factors. It is especially influenced by the temperature and the oxygen concentration. In general, it is preferred to utilize about 2 to 3 hours for the dropwise addition of the phenol and about a further 1 hour for the subsequent completion of oxidation.

The working up of the oxidation mixture in this process can be carried out in a conventional manner. Preferably, the quinone product is extracted with a water immiscible solvent, preferably a chlorinated hydrocarbon such as chloroform or carbon tetrachloride, dried in a conventional manner, evaporated under reduced pressure and purified by rectification. The catalyst remaining in the solution, after separation of the quinone, can be advantageously utilized, without further processing, in further batches.

As indicated above, the oxidation process in accordance with this invention can be carried out, if desired, in the presence of a complexing agent. In this process, any conventional complexing agent which holds copper, acting as an oxygen carrier, in solution in a polar solvent reaction medium during an oxidation reaction can be utilized. Among the preferred complexing agents are the alkyl and phenyl derivatives of a trivalent element of the fifth main group of the periodic system. Especially preferred complexing agents include: the amines, particularly di- and trialkylamines, quite particularly triethylamine, and the secondary cyclic amines, quite particularly piperidine and morpholine; as well as phosphines and arsines, especially trialkyl- or triphenyl-substituted phosphines and arsines, particularly triphenylphosphine and triphenyl arsine. The alkyl substituent in the complexing agents of this invention are the straight chain and branched chain alkyl groups containing 1 to 12 carbon atoms, preferably 1 to 6 carbon atoms, such as methyl, ethyl and isopropyl.

The examples which follow illustrate the process of this invention. The oxygen or oxygen-containing gas utilized is pure oxygen, containing no more than about 90% of other gases. Yield data is based on reacted phenol.

Example 1

149 g. of copper (II) chloride containing 2 mol of water of crystallization and 94 g. of m-cresol are introduced into a mixture of 513 g. of acetone and 670 g. of water and shaken in a closed system at 60° C. for 3 hours under an oxygen pressure of 30 atmospheres. The mixture is subsequently worked-up by treatment with 600 ml. of water, extraction several times with a total of 1000 ml. of carbon tetrachloride, and evaporation of the combined extracts under reduced pressure. The 2-methylquinone which remains behind boils at 70°–80° C./0.5 mm. Hg after rectification. Yield: 75.2%.

Example 2

149 g. of copper (II) chloride containing 2 mol of water of crystallization are dissolved in 1100 ml. of dimethylformamide and treated while shaking in a closed system under an oxygen pressure of 30 atmospheres at 60° C. over the course of 3 hours with a solution of 94 g. of o-cresol in 150 g. of dimethylformamide. The mixture is then worked up as described in Example 1. The resulting 2-methylquinone boils at 70°–80° C./0.5 mm. Hg after rectification. Yield: 40.8%.

Example 3

149 g. of copper (II) chloride containing 2 mol of water of crystallization and 106 g. of 2,3-dimethylphenol are introduced into a mixture of 513 g. of acetone and 630 g. of water and shaken in a closed system at 60° C. for 2.5 hours under an oxygen pressure of 30 atmospheres. The mixture is then worked up as described in Example 1. The resulting 2,3-dimethylquinone boils at 70°–80° C./0.5 mm. Hg after rectification. Yield: 75.0%.

Example 4

149 g. of copper (II) chloride containing 2 mol of water of crystallization and 106 g. of 2,6-dimethylphenol are dissolved in 1100 g. of dimethylformamide and shaken in a closed system at 60° C. for 2 hours under an oxygen pressure of 30 atmospheres. The mixture is then worked up as described in Example 1. The resulting 2,6-dimethylquinone boils at 70°–80° C./0.5 mm. Hg after rectification. Yield: 77.0%.

Example 5

172 g. of copper (I) chloride are suspended in 1100 g. of dimethylformamide and treated while shaking in a closed system under an oxygen pressure of 30 atmospheres at 60° C. over the course of 3 hours with a solution of 106 g. of 2,6-dimethylphenol in 150 g. of dimethylformamide. The mixture worked up as described in Example 1. The resulting 2,6-dimethylquinone boils at 70°–80° C./0.5 mm. Hg after rectification. Yield: 37.0%.

Example 6

A solution of 140 g. of 2,6-dimethylphenol in 150 g. of dimethylformamide is added dropwise over a period of 3 hours with stirring and oxygen gassing at 60° C. to a solution of 194.9 g. of copper (II) bromide in 400 g. of dimethylformamide. The mixture is stirred for a further 1 hour and worked up as described in Example 1. The resulting 2,6-dimethylquinone boils at 70°–80° C./0.5 mm. Hg after rectification. Yield: 65.0%.

Example 7

149 g. of copper (II) chloride containing 2 mol of water of crystallization and 106 g. of 3,5-dimethylphenol are introduced into a mixture of 513 g. of acetone and 630 g. of water and shaken in a closed system at 60° C. for 2 hours under an oxygen pressure of 30 atmospheres. The mixture is then worked up as described in Example 1. The resulting 2,6-dimethylquinone boils at 70°–80° C./0.5 mm. Hg after rectification. Yield: 85.0%.

Example 8

149 g. of copper (II) chloride containing 2 mol of water of crystallization and 106 g. of 2,5-dimethylphenol are introduced into a mixture of 513 g. of acetone and 630 g. of water and shaken in a closed system at 60° C. for 2.5 hours under an oxygen pressure of 30 atmospheres. The mixture is then worked up as described in Example 1. The resulting 2,5-dimethylphenol boils at 70°–80° C./0.5 mm. Hg after rectification. Yield: 82.0%.

Example 9

A solution of 150 g. of 2,3,6-trimethylphenol in 150 g. of dimethylformamide is added dropwise with stirring and oxygen gassing at 60° C. within 2 hours to a solution of 149 g. of copper (II) chloride containing 2 mol of water of crystallization in 250 g. of dimethylformamide. The mixture is stirred for a further 1 hour and then worked up, utilizing 600 ml. of water, as described in Example 1. The resulting 2,3,5-trimethylquinone boils at 70°–80° C./0.5 mm. Hg after rectification. Yield: 96.2%.

Example 10

A solution of 150 g. of 2,3,6-trimethylphenol in 150 g. of dimethylformamide is added dropwise with stirring and oxygen gassing at 60° C. within 3 hours to a solution of 194.8 g. of copper (II) bromide in 250 g. of dimethylformamide. The mixture is stirred for a further 1 hour and worked up as described in Example 1. The resulting 2,3,5-trimethylquinone boils at 70°–80° C./0.5 mm. Hg after rectification. Yield: 86.7%.

Example 11

A solution of 60 g. of 2,3,6-trimethylphenol in 60 g. of dimethylformamide is added dropwise with stirring and oxygen gassing at 60° C. within 2 hours to a suspension of 50 g. of copper (I) bromide in 100 g. of dimethylformamide. The mixture is stirred for a further 1 hour and worked up as described in Example 1. The resulting 2,3,5-trimethylquinone boils at 70°–80° C./0.5 mm. Hg after rectification. Yield: 65.0%.

Example 12

57.6 g. of copper (I) chloride and 80 g. of 2,3,6-trimethylphenol are introduced into a mixture of 1052 g. of acetone and 1760 g. of water. The mixture is filled into a pressure vessel, shaken under an oxygen pressure of 30 atmospheres for 3 hours at 60° C. and subsequently worked up as described in Example 1. The resulting 2,3,5-trimethylquinone boils at 70°–80° C./0.5 mm. Hg after rectification. Yield: 77.4%.

Example 13

218.3 g. of copper sulphate containing 5 mol of water of crystallization and 180 g. of sodium bromide are introduced into 250 g. of dimethylformamide. The mixture is treated dropwise with stirring and oxygen gassing at 60° C. within 2 hours with a solution of 150 g. of 2,3,6-trimethylphenol in 150 g. of dimethylformamide. The mixture is stirred for a further 2 hours and worked up as described in Example 1. The resulting 2,3,5-trimethylquinone boils at 70°–80° C./0.5 mm. Hg after rectification. Yield: 85.5%.

Example 14

48.5 g. of copper (II) chloride and 75.5 g. of 2,3,5-trimethylphenol are introduced into a mixture of 1052 g. of acetone and 1760 g. of water. The mixture is filled into a pressure vessel, shaken under an oxygen pressure of 30 atmospheres for 2.5 hours at 60° C. and subsequently worked up as described in Example 1. The resulting 2,3,5-trimethyl quinone boils at 70°–80° C./0.5 mm. Hg after rectification. Yield: 79.8%.

Example 15

40.8 g. of 4-chloro-2,3,6-trimethylphenol are added dropwise with stirring and oxygen gassing at 60° C. within 2 hours to a solution of 40 g. of copper (II) chloride containing 2 mol of water of crystallization in 40 g. of dimethylformamide and 40 g. of water. The mixture is stirred for a further 1 hour and worked up as described in Example 1. The resulting 2,3,5-trimethylquinone boils at 70°–80° C./0.5 mm. Hg after rectification. Yield: 99.0%.

Example 16

74.5 g. of copper (II) chloride containing 2 mol of water of crystallization are dissolved in a mixture of 88.8 g. of triethylamine, 100 g. of water and 750 g. of dimethylformamide. The catalyst solution is filled into a pressure vessel, heated up to 50° C. and treated under an oxygen presure of 30 atmospheres within 2 hours with a solution of 75 g. of 2,3,6-trimethylphenol in 75 g. of dimethylformamide. The mixture is worked up as described in Example 1. The resulting 2,3,5-trimethylquinone boils at 70°–80° C./0.5 mm. Hg after rectification. Yield: 44.6%.

Example 17

A solution of 65.5 g. of 2,3,5,6-tetramethylphenol in 300 g. of ethylene glycol monomethyl ether is added dropwise with stirring and oxygen passing at 60° C. within 3 hours to a solution of 74.5 g. of copper (II) chloride containing 2 mol of water of crystallization in 300 g. of ethylene glycol monomethyl ether. The mixture is stirred for a further 1 hour and worked up as described in Example 1. The resulting duroquinone boils at 70°–80° C./0.5 mm. Hg after rectification. Yield: 99%.

I claim:

1. A process for obtaining a quinone of the formula:

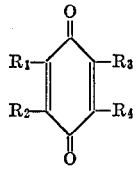

wherein $R_1$, $R_2$, $R_3$ and $R_4$ are hydrogen or methyl; with the proviso that at least one of $R_1$, $R_2$, $R_3$ and $R_4$ is methyl;

comprising oxidizing a solution of a phenol of the formula:

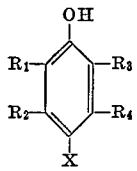

wherein $R_1$, $R_2$, $R_3$ and $R_4$ are as above and X is hydrogen, chlorine, bromine or iodine;

and copper ions and halogen ions in an inert organic solvent with oxygen or an oxygen-containing gas in the absence of a complexing agent selected from the group consisting of amines, trialkylphosphines, triphenylphosphine, trialkylarsines and triphenylarsine, the alkyl substituents in said complexing agents having from 1–12 carbon atoms.

2. The process of claim 1 wherein $R_1$ and $R_2$ are methyl and only one of $R_3$ and $R_4$ is methyl.

3. The process of claim 1 wherein said solvent is a polar, water-miscible or water-soluble solvent.

4. The process of claim 3 wherein said solvent contains water.

5. The process of claim 1 wherein said copper ions are copper (II) ions.

6. The process of claim 1 wherein said halogen ions are chlorine or bromine ions.

7. The process of claim 6 wherein said halogen ions are chlorine ions.

8. The process of claim 1 wherein said phenol is treated with at least the stoichiometric amount of oxygen necessary for conversion of said phenol to said quinone.

9. The process of claim 1 wherein a solution of said phenol in an inert organic solvent is added dropwise to a solution of said copper and halogen ions in an inert organic solvent to form said solution containing said phenol and said ions during the treatment with oxygen or an oxygen-containing gas.

10. The process of claim 1 wherein said process is carried out at a temperature of about 22° C. to the boiling point of said solution.

11. The process of claim 1 wherein said process is carried out under an oxygen pressure of 1–100 atmospheres.

12. The process of claim 1 wherein pure oxygen is utilized.

13. The process of claim 1 wherein a ratio of gram atom of copper to mol of phenol in said solvent of about 0.5:1 to about 2:1 is utilized.

References Cited

UNITED STATES PATENTS

| | | | |
|---|---|---|---|
| 3,306,874 | 2/1967 | Hay | 260—396 R |
| 3,219,625 | 11/1965 | Blanchard et al. | 260—396 R |
| 3,549,670 | 12/1970 | Spousta | 260—396 R |
| 3,663,578 | 5/1972 | Von Kutepow et al. | 260—396 R |

VIVIAN GARNER, Primary Examiner

U.S. Cl. X.R.

260—47 R